US012311400B2

(12) United States Patent
Morizono

(10) Patent No.: US 12,311,400 B2
(45) Date of Patent: May 27, 2025

(54) TWIN-FLUID NOZZLE SPRAY APPARATUS

(71) Applicant: TMEIC CORPORATION, Tokyo (JP)

(72) Inventor: Yasushi Morizono, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 17/755,440

(22) PCT Filed: Oct. 13, 2020

(86) PCT No.: PCT/JP2020/038588
§ 371 (c)(1),
(2) Date: Apr. 29, 2022

(87) PCT Pub. No.: WO2022/079787
PCT Pub. Date: Apr. 21, 2022

(65) Prior Publication Data
US 2024/0299962 A1 Sep. 12, 2024

(51) Int. Cl.
*B05B 1/30* (2006.01)
*B05B 7/08* (2006.01)

(52) U.S. Cl.
CPC .......... *B05B 7/0815* (2013.01); *B05B 1/3046* (2013.01)

(58) Field of Classification Search
CPC ... B05B 7/0815; B05B 1/3046; B05B 12/082; B05B 12/085; B05B 12/006; B05B 12/14; B05B 7/12; B05B 7/1254; B05B 7/0416
See application file for complete search history.

(56) References Cited

U.S. PATENT DOCUMENTS 5,772,868 A 6/1998 Reinhardt
2003/0132310 A1* 7/2003 Polk .......................... B05B 9/06 239/159

FOREIGN PATENT DOCUMENTS

JP 63-12363 A 1/1988
JP 2004-237188 A 8/2004
JP 2013-96648 A 5/2013
JP 2014-023976 A 2/2014
(Continued)

OTHER PUBLICATIONS

International Search Report and Written Opinion mailed on Dec. 8, 2020, received for PCT Application PCT/JP2020/038588, Filed on Oct. 13, 2020, with English translation of International Search Report, 12 pages.
(Continued)

*Primary Examiner* — Christopher R Dandridge
(74) *Attorney, Agent, or Firm* — XSENSUS LLP

(57) ABSTRACT

A twin-fluid nozzle spray apparatus according to one aspect includes a gas regulator that outputs compressed gas at a predetermined pressure in a compressed-gas supply system, a positive displacement pump that includes a relief valve configured to feed pressurized liquid at a pressure exceeding a predetermined pressure in a pressurized-liquid supply system back to a liquid supply side, and outputs the pressurized liquid, a liquid regulator or a needle valve that outputs the pressurized liquid output by the positive displacement pump while maintaining a pressure of the pressurized liquid at a discharge pressure having a predetermined value, and a twin-fluid nozzle that mixes and sprays the compressed gas output by the gas regulator and the pressurized liquid output by the liquid regulator or the needle valve.

7 Claims, 4 Drawing Sheets

(56) References Cited

FOREIGN PATENT DOCUMENTS

| | | | | |
|---|---|---|---|---|
| JP | 2014-66458 | A | 4/2014 | |
| JP | 5898581 | B2 | 4/2016 | |
| JP | 2016-153122 | A | 8/2016 | |
| JP | 2017-176975 | A | 10/2017 | |
| JP | 2017176975 | * | 10/2017 | ............ B05B 12/12 |
| JP | 2019-209233 | A | 12/2019 | |
| KR | 10-2001-0100669 | A | 11/2001 | |
| KR | 10-2007-0025878 | A | 3/2007 | |
| KR | 10-2018-0014901 | A | 2/2018 | |

OTHER PUBLICATIONS

Office Action issued on Feb. 10, 2023, in corresponding Chinese patent Application No. 202080072197.3, 12 pages.

Chinese Office Action issued May 24, 2023 in corresponding Chinese Patent Application No. 202080072197.3 (with machine-generated English translation), 21 pages.

Office Action dated Jun. 20, 2023 in the corresponding Korean patent application No. 10-2022-7014077, 11pp.

* cited by examiner

TWIN-FLUID NOZZLE SPRAY APPARATUS

CROSS-REFERENCE TO RELATED APPLICATION

The present application is based on PCT filing PCT/JP2020/038588, filed Oct. 13, 2020, the entire contents of which is incorporated herein by reference.

FIELD

The present invention relates to a twin-fluid nozzle spray apparatus.

BACKGROUND

For example, there has been known a twin-fluid nozzle spray apparatus that sprays fine particles of liquid such as water atomized by mixing the liquid with compressed gas using fast flow of the gas.

There has been well-known a twin-fluid spray system including a control device that previously measures a nozzle characteristic of a twin-fluid nozzle configured to mix and spray compressed gas and pressurized liquid and controls a pressure or flow rate of the gas to be applied to the twin-fluid nozzle and a pressure or flow rate of the liquid to be applied to the twin-fluid nozzle (for example, see PTL 1).

The applicant has recognized the following documents, including the document described above, as those relating to the present invention.

CITATION LIST

Patent Literature

[PTL 1] JP 2017-176975 A
[PTL 2] JP 2013-096648 A
[PTL 3] JP 2019-209233 A
[PTL 4] JP 5898581 B

SUMMARY

Technical Problem

However, a large apparatus and a complex configuration are needed to adjust, with good accuracy, a spray amount of the twin-fluid nozzle and a particle size of the fine particle to be sprayed from the twin-fluid nozzle.

The present invention has been made to solve the above-described problems, and its object is to provide a twin-fluid nozzle spray apparatus capable of adjusting a spray with high accuracy in a simple configuration.

Means for Solving the Problem

A twin-fluid nozzle spray apparatus according to an aspect of the present invention comprising:

- a gas regulator that outputs compressed gas at a predetermined pressure in a compressed-gas supply system;
- a positive displacement pump that comprises a relief valve configured to feed pressurized liquid at a pressure exceeding a predetermined pressure in a pressurized-liquid supply system back to a liquid supply side, and outputs the pressurized liquid;
- a liquid regulator or a needle valve that outputs the pressurized liquid output by the positive displacement pump while maintaining a pressure of the pressurized liquid at a discharge pressure having a predetermined value; and
- a twin-fluid nozzle that mixes and sprays the compressed gas output by the gas regulator and the pressurized liquid output by the liquid regulator or the needle valve.

Advantageous Effects of Invention

According to the present invention, there can be provided a twin-fluid nozzle spray apparatus capable of adjusting a spray with high accuracy in a simple configuration.

DESCRIPTION OF EMBODIMENTS

Figure 1:
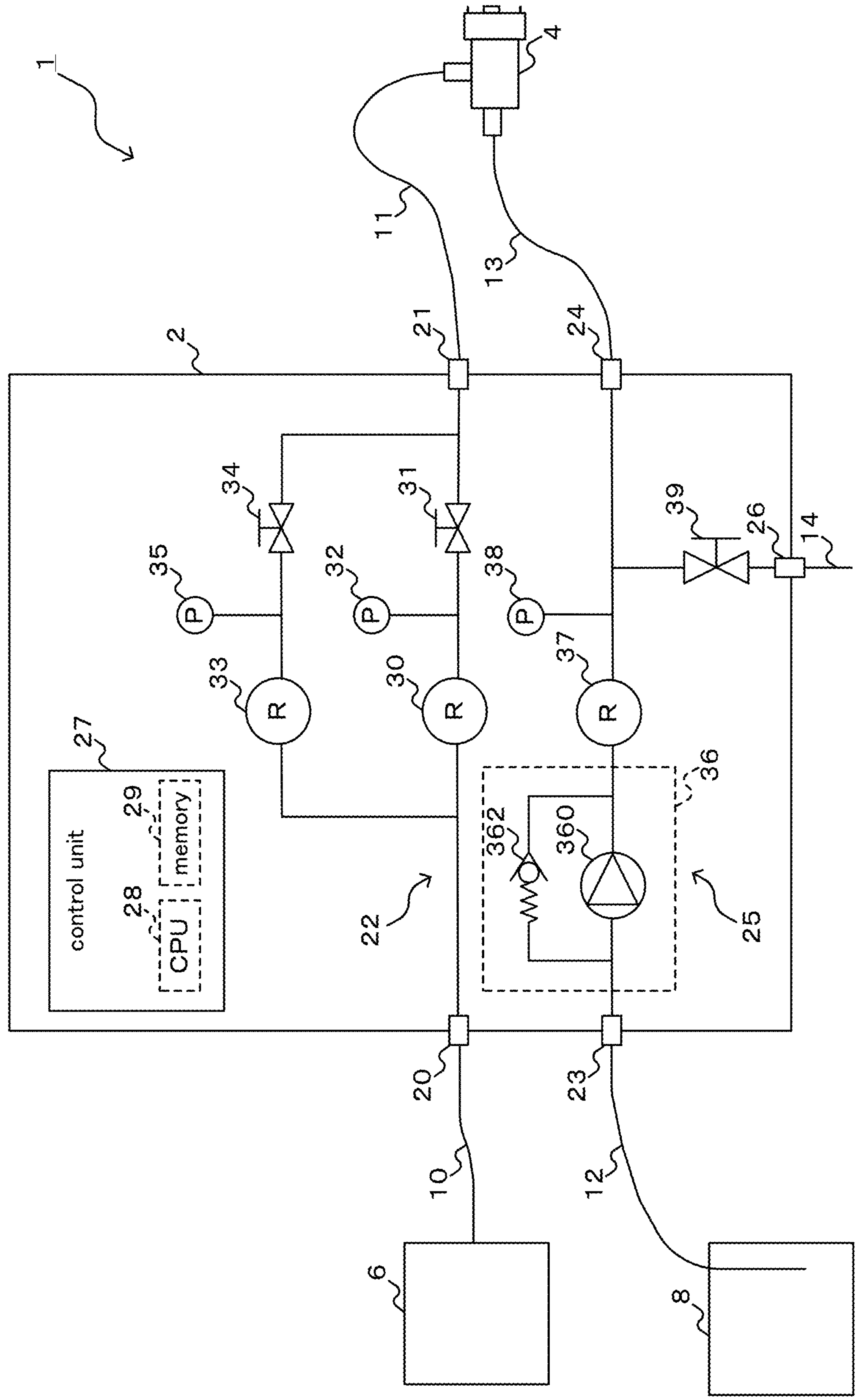
FIG. 1 shows a configuration example of a twin-fluid nozzle spray apparatus according to a first embodiment of the present invention.

Hereinafter, a first embodiment of a twin-fluid nozzle spray apparatus will be described using the drawings. FIG. 1 is a diagram illustrating a configuration example of a twin-fluid nozzle spray apparatus 1 according to one embodiment.

For example, the twin-fluid nozzle spray apparatus 1 includes a spray apparatus body 2 and a twin-fluid nozzle 4, and has a function of spraying fine particles of liquid such as water atomized by mixing the liquid with compressed gas using fast flow of the gas.

The spray apparatus body 2 includes a compressed-gas supply system 22 in which compressed gas, which is fluid, flows from a gas supply port 20 side toward a gas discharge port 21 side, so that the compressed gas is supplied to the twin-fluid nozzle 4. Additionally, the spray apparatus body 2 includes a pressurized-liquid supply system 25 in which pressurized liquid, which is fluid, flows from a liquid supply port 23 side toward a liquid discharge port 24 side, so that the pressurized liquid is supplied to the twin-fluid nozzle 4.

The gas supply port 20 is connected to a compressor 6 through a pipe 10. The gas discharge port 21 is connected to the twin-fluid nozzle 4 through a pipe 11. The liquid supply port 23 is connected to a liquid tank 8 through a pipe 12. The liquid discharge port 24 is connected to the twin-fluid nozzle 4 through a pipe 13.

The spray apparatus body 2 is provided with a discharge port 26 for discharging a part of the liquid that remains in the pressurized-liquid supply system 25 when the spray from the twin-fluid nozzle 4 is stopped. The discharge port 26 is configured to discharge a part of the liquid remaining in the pressurized-liquid supply system 25 to the outside through a pipe 14.

The pipes 10 to 14 each are formed of a member partially or entirely having elasticity, for example. The pipe forming each of the compressed-gas supply system 22 and the pressurized-liquid supply system 25 is also formed of a member partially or entirely having the elasticity, for example. Accordingly, even when pulsation occurs in the fluid, the influence of the pulsation can be reduced by the pipe having the elasticity.

The spray apparatus body 2 includes, for example, a control unit 27 therein. The control unit 27 includes a CPU 28 and a memory 29, and functions as a computer to control each component to be controlled included in the spray apparatus body 2. However, the specific components to be controlled by the control unit 27 will be described later.

The twin-fluid nozzle 4 mixes internally and sprays the compressed gas and the pressurized liquid while transmitting a pressure of the compressed gas supplied from the compressed-gas supply system 22 of the spray apparatus body 2 to the pressurized liquid supplied from the pressurized-liquid supply system 25 of the spray apparatus body 2 in a counter-flow direction to the liquid flow.

For example, the twin-fluid nozzle 4 is a counter-pressure twin-fluid nozzle configured to apply the compressed gas to the pressurized liquid flowing in a center portion toward a spray port from two directions facing and crossing each other, thereby atomizing the liquid in such a manner that a liquid column flowing out of the twin-fluid nozzle 4 is sandwiched between two gas columns, and spray fine particles of the atomized liquid to the outside.

Accordingly, the twin-fluid nozzle 4 has a feature capable of spraying, to the outside, the fine particles of the liquid with a small amount of compressed gas.

The compressor 6 compresses, for example, gas such as air and supplies the compressed gas to the spray apparatus body 2 through the pipe 10. The liquid tank 8 supplies, for example, liquid such as water stored therein to the spray apparatus body 2 through the pipe 12. Additionally, the pipe 14 connected to the discharge port 26 may be provided to return the liquid discharged from the discharge port 26 to the liquid tank 8.

Next, specific configuration examples of the compressed-gas supply system 22 and the pressurized-liquid supply system 25 included in the spray apparatus body 2 will be described.

The compressed-gas supply system 22 includes a gas regulator 30, an electromagnetic valve 31, a pressure gauge 32, a low-pressure regulator 33, an electromagnetic valve 34, and a pressure gauge 35 in a compressed-gas flow path extending from the gas supply port 20 to the gas discharge port 21.

The gas regulator 30 outputs, as the compressed gas at a predetermined constant pressure, the gas supplied from the gas supply port 20 in the compressed-gas supply system 22, to the gas discharge port 21 side through the electromagnetic valve 31.

The electromagnetic valve 31 is turned on or off according to the control of the control unit 27, thereby permitting or blocking the supply of the compressed gas output by the gas regulator 30 to the gas discharge port 21.

The pressure gauge 32 detects, for example, a pressure of the compressed gas between the gas regulator 30 and the electromagnetic valve 31, and outputs the detection result to the control unit 27. The pressure gauge 32 may be positioned to detect a pressure of the pipe between the electromagnetic valve 31 and the gas discharge port 21. However, the pressure gauge 32 may be detached after the predetermined setting of the gas regulator 30 to the spray apparatus body 2 is completed.

The low-pressure regulator 33 is provided in parallel to the gas regulator 30 in the compressed-gas supply system 22, and outputs, to the gas discharge port 21 side, the gas supplied from the gas supply port 20 as low-pressure compressed gas at a predetermined constant pressure which is lower than the pressure of the gas output by the gas regulator 30.

The electromagnetic valve 34 is turned on or off according to the control of the control unit 27, thereby permitting or blocking the supply of the low-pressure compressed gas output by the low-pressure regulator 33 to the gas discharge port 21.

The pressure gauge 35 detects, for example, a pressure of the low-pressure compressed gas between the low-pressure regulator 33 and the electromagnetic valve 34, and outputs the detection result to the control unit 27. However, the pressure gauge 35 may be detached after the predetermined setting to the spray apparatus body 2 is completed. When the pressure gauge 32 is positioned to detect a pressure of the pipe between the electromagnetic valve 31 and the gas discharge port 21, the pressure gauge 35 need not be provided, so that the pressure gauge 32 functions as the pressure gauge 35.

The pressurized-liquid supply system 25 includes a positive displacement pump 36, a liquid regulator 37, a pressure gauge 38, and an electromagnetic valve 39 in a pressurized-liquid flow path extending from the liquid supply port 23 to the liquid discharge port 24.

The positive displacement pump 36 includes, for example, a diaphragm pump 360 and a relief valve 362, and starts or ends (stops) the operation according to the control of the control unit 27, for example.

The diaphragm pump 360 is driven by a drive device such as a motor or solenoid (not illustrated), and adjusts a discharge amount according to the control of the control unit 27. For example, the control unit 27 adjusts an operating frequency of the drive device, or a ratio of an operation period (ON period) to a stop period (OFF period) of the drive device in a predetermined cycle, thereby adjusting a discharge amount of the diaphragm pump 360.

The diaphragm pump 360 is, for example, a self-priming pump, and sucks in the liquid stored in the liquid tank 8 through the liquid supply port 23 and the pipe 12, and outputs the liquid as predetermined pressurized liquid to the liquid regulator 37.

The diaphragm pump 360 has a feature capable of ensuring the pressure of about +300 to 600 kPa on the discharge side, when the pressure on a liquid-feeding side is −25 to +350 kPa, for example. Additionally, the diaphragm pump 360 has features that the pressure on the liquid-feeding side does not affect the discharge side and the self-priming performance can be ensured by enhancing the sealing performance of a check valve in the diaphragm pump 360. Therefore, the diaphragm pump 360 can be applied under a wide range of feed liquid pressure conditions such as when the liquid is sucked in from the tank at the atmosphere positioned 2.5 m below, and when the liquid is supplied from the pressurized supply system such as tap water. The diaphragm pump 360 has few sliding portions, so that the maintenance is facilitated.

The relief valve 362 is provided in parallel to the diaphragm pump 360. The relief valve 362 feeds the pressurized liquid at a pressure exceeding the predetermined pressure in the pressurized-liquid supply system 25 back to the liquid supply side (liquid supply port 23 side) from the liquid output side (liquid regulator 37 side) of the diaphragm pump 360, thereby preventing the pressure in the diaphragm pump 360 from becoming too high.

The positive displacement pump 36 includes the self-priming diaphragm pump 360 herein, but may be a pump having another configuration. Alternatively, the diaphragm pump 360 and the relief valve 362 may be provided independently of each other.

The liquid regulator 37 maintains the pressurized liquid output by the positive displacement pump 36 at a constant discharge pressure having a predetermined value in the pressurized-liquid supply system 25, and outputs it to the liquid discharge port 24. At this time, even when pulsation occurs in the pressurized liquid output by the positive displacement pump 36, the liquid regulator 37 can reduce the influence of the pulsation.

The pressure gauge 38 detects a pressure of the pressurized liquid output by the liquid regulator 37, and outputs the detection result to the control unit 27. However, the pressure gauge 38 may be detached after the predetermined setting to the spray apparatus body 2 is completed.

The electromagnetic valve 39 is turned on or off according to the control of the control unit 27. Specifically, the electromagnetic valve 39 is a discharge valve configured to discharge a part or the whole of the pressurized liquid output by the liquid regulator 37 from the pressurized-liquid supply system 25 through the discharge port 26 using an atmospheric pressure from the twin-fluid nozzle 4 or a pump head difference when the spray from the twin-fluid nozzle 4 is stopped. For example, when the electromagnetic valve 39 is open, a part or the whole of the liquid remaining in the pipe extending from the discharge side of the positive displacement pump 36 to the twin-fluid nozzle 4 can be discharged from the discharge port 26 using a siphon principle or the like.

Next, an example of an operation of the twin-fluid nozzle spray apparatus 1 will be described. In the twin-fluid nozzle spray apparatus 1, in order to emit the spray from the twin-fluid nozzle 4, the control unit 27 closes the electromagnetic valve 34 and the electromagnetic valve 39, opens the electromagnetic valve 31, and controls the positive displacement pump 36 to operate. When being supplied with the compressed gas from the compressor 6 and receiving the supply of the liquid from the liquid tank 8, the spray apparatus body 2 outputs the compressed gas from the gas discharge port 21 to the twin-fluid nozzle 4, and outputs the pressurized liquid from the liquid discharge port 24 to the twin-fluid nozzle 4.

The twin-fluid nozzle 4 internally mixes the compressed gas supplied through the pipe 11 with the pressurized liquid supplied through the liquid supply port 23, and sprays fine particles of the atomized liquid to the outside.

The control unit 27 controls, for example, the electromagnetic valve 31 and the positive displacement pump 36, and switches between permitting and blocking the supply of the compressed gas and the pressurized liquid to the twin-fluid nozzle 4, thereby performing time proportional control of a spray amount of the twin-fluid nozzle 4. For example, the control unit 27 controls the operation period of the positive displacement pump 36 (ON period of the drive device) according to the spray amount in a certain cycle from about 30 to 120 seconds.

In the twin-fluid nozzle spray apparatus 1, in order to temporarily stop the spray from the twin-fluid nozzle 4 (OFF period of the drive device in the time proportional control), the control unit 27 stops the positive displacement pump 36 to stop the supply of the pressurized liquid to the twin-fluid nozzle 4, and closes the electromagnetic valve 31 to open the electromagnetic valve 34. Then, the twin-fluid nozzle spray apparatus 1 supplies the low-pressure compressed gas from the low-pressure regulator 33 to the twin-fluid nozzle 4, thereby preventing the liquid from dripping from the twin-fluid nozzle 4 due to the atmospheric pressure from the low-pressure regulator 33.

In order to completely stop the spray, the control unit 27 closes the electromagnetic valve 34, stops the positive displacement pump 36 in a state in which the electromagnetic valve 31 is open, and opens the electromagnetic valve 39, thereby discharging the liquid remaining in the pipe 13 and the like from the discharge port 26.

The spray apparatus body 2 outputs the compressed gas and the pressurized liquid to the twin-fluid nozzle 4 while accurately maintaining the pressure of each of the compressed gas and the pressurized liquid within ±1 to 5 kPa of a target value, for example.

Thus, the twin-fluid nozzle spray apparatus 1 includes the gas regulator 30, the positive displacement pump 36, the liquid regulator 37, and the twin-fluid nozzle 4. Combining each function of the above-described components brings about an effect of making it possible to adjust the spray with high accuracy in a simple configuration.

Figure 2:
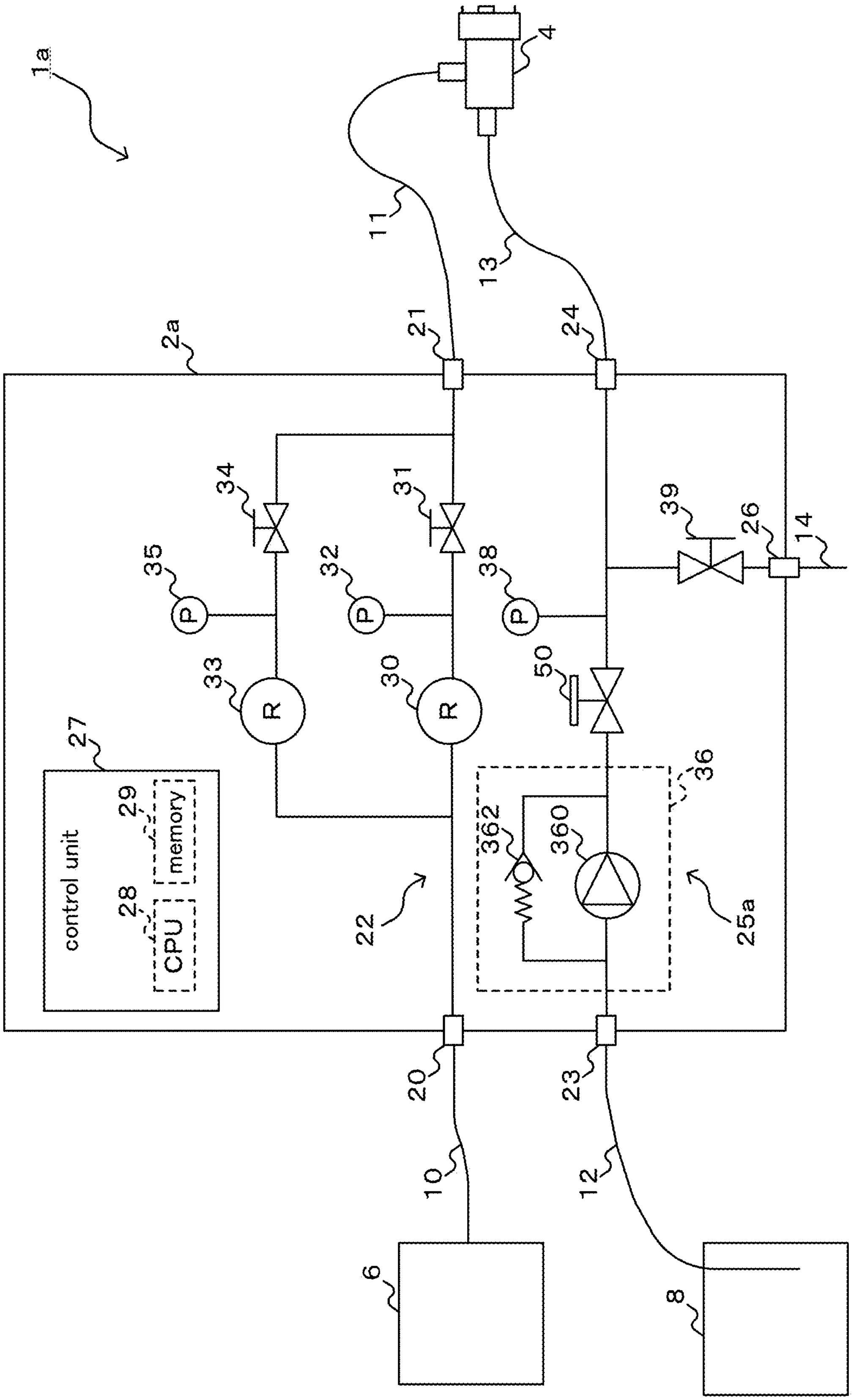
FIG. 2 is a diagram illustrating a configuration example of the first modification of the twin-fluid nozzle spray apparatus.

Next, a first modification of the first embodiment of the twin-fluid nozzle spray apparatus 1 will be described. FIG. 2 is a diagram illustrating a configuration example of the first modification (a twin-fluid nozzle spray apparatus 1*a*) of the twin-fluid nozzle spray apparatus 1. Note that the same reference numerals are assigned to substantially the same components as the above-described components.

The twin-fluid nozzle spray apparatus 1*a* illustrated in FIG. 2 includes a compressed-gas supply system 22 and a pressurized-liquid supply system 25*a* in a spray apparatus body 2*a*. The pressurized-liquid supply system 25*a* includes a positive displacement pump 36, a needle valve 50, a pressure gauge 38, and an electromagnetic valve 39 in a pressurized-liquid flow path from a liquid supply port 23 to a liquid discharge port 24. A difference from the first embodiment is that the needle valve 50 is used instead of the liquid regulator 37. For example, the needle valve 50 is an electric powered opening degree adjustable valve.

The needle valve 50 changes an opening degree according to the control of a control unit 27, and outputs, to the liquid discharge port 24, pressurized liquid output by the positive displacement pump 36 in the pressurized-liquid supply system 25*a* while maintaining the pressure of the pressurized liquid at a predetermined discharge pressure. More specifically, the needle valve 50 has a Cv value of, for example, 0.05 to 1 when fully open, and is adapted to be capable of adjusting a flow rate and the like of the pressurized liquid with higher accuracy than a valve having another configuration (e.g., a ball valve).

On the other hand, for example, the ball valve of 15A size generally has a Cv value of 6 or the like. For example, when the needle valve 50 is replaced with the ball valve, it is difficult to adjust the flow rate of the like of a very small amount of the pressurized liquid with high accuracy similar to that of the needle valve 50 even when the rangeability of the ball valve is 30:1. For example, in an example illustrated in FIG. 2, the number of twin-fluid nozzles 4 is one. However, in some cases, a plurality of twin-fluid nozzles 4 are provided, and a valve is provided on a liquid input side of each twin-fluid nozzle 4, so that the spray amount can be changed in a wide range by changing the number of operations of the twin-fluid nozzles 4. In this case, the combined head loss on the twin-fluid nozzle 4 side viewed from the liquid discharge port 24 greatly fluctuates according to the number of operations of the twin-fluid nozzles 4. However, an instrument capable of adjusting the opening degree with high accuracy similar to that of the needle valve 50 is used to be adaptable to such fluctuation.

The control unit 27 controls, for example, an electromagnetic valve 31, the positive displacement pump 36, and the needle valve 50, and switches between permitting and blocking the supply of the compressed gas and the pressurized liquid to the twin-fluid nozzle 4, thereby performing time proportional control of a spray amount of the twin-fluid nozzle 4 in the same manner as in the first embodiment. Additionally, the control unit 27 controls at least any of a pressure of the compressed gas, a pressure of the pressurized liquid, and an opening degree of the needle valve 50, thereby controlling spray characteristics (a spray amount, a particle size, and the like) of the twin-fluid nozzle 4.

Similarly to the first embodiment, in order to temporarily stop the spray from the twin-fluid nozzle 4, the control unit 27 blocks the supply of the pressurized liquid to the twin-fluid nozzle 4 by closing the needle valve 50, and closes the electromagnetic valve 31 to open the electromagnetic valve 34. Then, the twin-fluid nozzle spray apparatus 1*a* supplies the low-pressure compressed gas from a low-pressure regulator 33 to the twin-fluid nozzle 4, thereby preventing the liquid from dripping from the twin-fluid nozzle 4 due to the atmospheric pressure from the low-pressure regulator 33. Furthermore, the spray can be completely stopped in the same manner as in the first embodiment, and therefore description thereof will be omitted.

Figure 3:
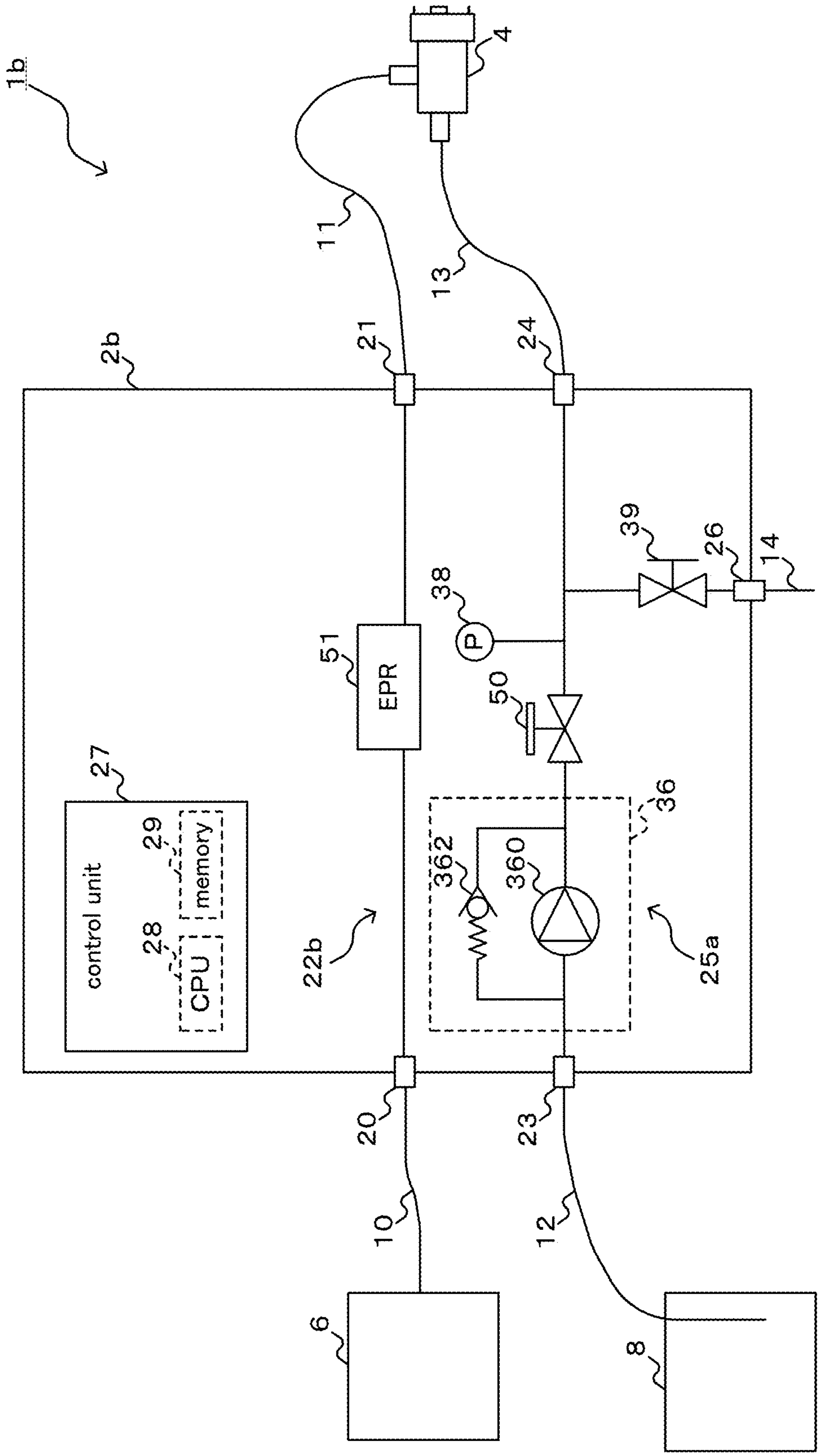
FIG. 3 is a diagram illustrating a configuration example of the second modification of the twin-fluid nozzle spray apparatus.

Next, a second modification of the first embodiment of the twin-fluid nozzle spray apparatus 1 will be described. FIG. 3 is a diagram illustrating a configuration example of the second modification (a twin-fluid nozzle spray apparatus 1*b*) of the twin-fluid nozzle spray apparatus 1. Note that the same reference numerals are assigned to substantially the same components as the above-described components.

The twin-fluid nozzle spray apparatus 1*b* illustrated in FIG. 3 includes a compressed-gas supply system 22*b* and a pressurized-liquid supply system 25*a* in a spray apparatus body 2*b*. The compressed-gas supply system 22*b* includes an electro-pneumatic regulator (EPR) 51 in a compressed-gas flow path from a gas supply port 20 to a gas discharge port 21. A difference from the first modification of the twin-fluid nozzle spray apparatus 1, illustrated in FIG. 2 is that the electro-pneumatic regulator 51 is used instead of the gas regulator 30, the low-pressure regulator 33, the electromagnetic valves 31 and 34, and the pressure gauges 32 and 35.

The electro-pneumatic regulator 51 decompresses the gas supplied from the gas supply port 20 in the compressed-gas supply system 22*b* according to the control of the control unit 27, and permits or blocks the supply of the compressed gas at a predetermined pressure to the gas discharge port 21.

The control unit 27 controls the supply pressure of each of the compressed gas and the pressurized liquid to the twin-fluid nozzle 4, thereby performing proportional control of a spray amount of the twin-fluid nozzle 4. Additionally, the control unit 27 controls at least any of a pressure of the compressed gas and a pressure of the pressurized liquid, thereby controlling spray characteristics (a spray amount, a particle size, and the like) of the twin-fluid nozzle 4. As a control method, the pressure of the compressed gas or the pressure of the pressurized liquid may be changed according to the spray amount, and the time proportional control of the spray amount may be performed by controlling the supply pressure of the compressed gas and permitting or blocking the supply of the pressurized liquid in the same manner as in the first embodiment.

In order to temporarily stop the spray from the twin-fluid nozzle 4, the control unit 27 stops a positive displacement pump 36 to block the supply of the pressurized liquid to the twin-fluid nozzle 4, and supplies the low-pressure compressed gas equivalent to that of the above-described low-pressure regulator 33, from the electro-pneumatic regulator 51 to the twin-fluid nozzle 4, thereby preventing the liquid from dripping from the twin-fluid nozzle 4 due to the atmospheric pressure from the electro-pneumatic regulator 51. In order to completely stop the spray, the control unit 27 stops the positive displacement pump 36 in a state in which the compressed gas at a predetermined pressure is supplied from the electro-pneumatic regulator 51 to the twin-fluid nozzle 4, and opens the electromagnetic valve 39, thereby discharging the liquid remaining in a pipe 13 and the like from a discharge port 26. Note that in the second modification, the liquid regulator 37 may be used instead of the needle valve 50.

Figure 4:
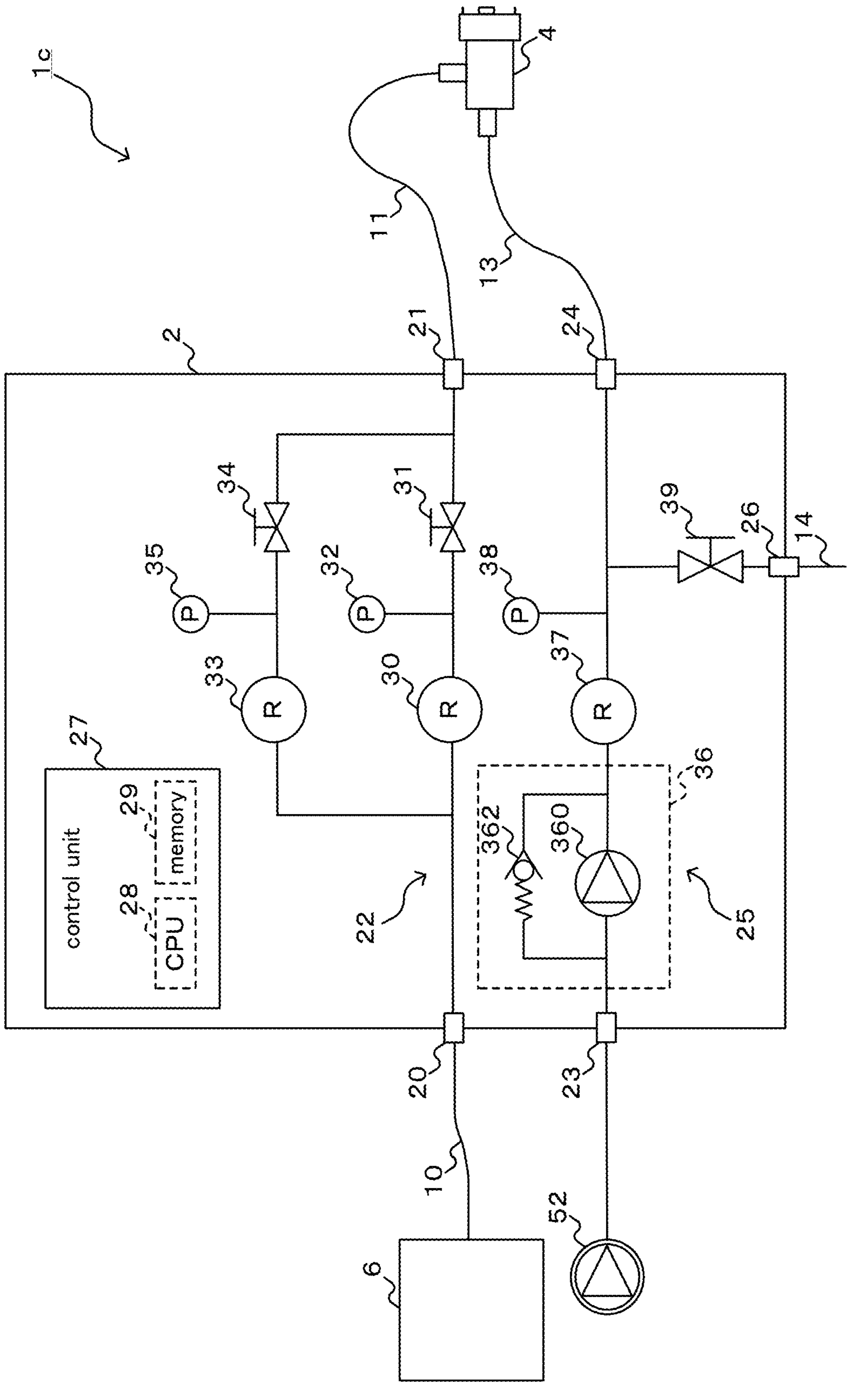
FIG. 4 is a diagram illustrating a configuration example of the third modification of the twin-fluid nozzle spray apparatus.

Next, a third modification of the twin-fluid nozzle spray apparatus 1 will be described. FIG. 4 is a diagram illustrating a configuration example of the third modification (a twin-fluid nozzle spray apparatus 1*c*) of the twin-fluid nozzle spray apparatus 1. Note that the same reference numerals are assigned to substantially the same components as the above-described components.

The twin-fluid nozzle spray apparatus 1*c* illustrated in FIG. 4 is different from the twin-fluid nozzle spray apparatus 1 illustrated in FIG. 1 in that the liquid tank 8 is replaced with a water supply source 52 such as tap water (or other pumps).

In the twin-fluid nozzle spray apparatus 1 illustrated in FIG. 1, the positive displacement pump 36 sucks up the liquid to which the atmospheric pressure is applied, for example, and outputs the liquid to the liquid regulator 37.

On the other hand, in the twin-fluid nozzle spray apparatus 1*c* illustrated in FIG. 4, a positive displacement pump 36 sucks up the liquid to which a pressure of the tap water or the like is applied, from the water supply source 52, and outputs the liquid to the liquid regulator 37.

In a pressurized-liquid supply system 25, a spray apparatus body 2 increases the pressure of the liquid to 0.3 to 0.6 MPa which is higher than 0.1 to 0.3 MPa as the typical supply water pressure of tap water or the like.

That is, the spray apparatus body 2 sucks up the liquid over a wide pressure range from the water supply source to enable the twin-fluid nozzle 4 to spray the liquid. Therefore, in the liquid tank 8, it is not necessary to pressurize the liquid.

Each control function to be performed by the control unit 27 may be partially or entirely configured by hardware such as a programmable logic device (PLD) or a field programmable gate array (FPGA) or may be configured as a program to be executed by a CPU or the like.

In the first embodiment, the first modification, and the third modification, in the case where the loss of the compressed gas is negligible when the spray from the twin-fluid nozzle 4 is temporarily stopped, the low-pressure regulator 33, the pressure gauge 35, and the electromagnetic valve 34 need not be provided. In this case, even when the spray from the twin-fluid nozzle 4 is temporarily stopped, the compressed gas at a pressure similar to that during the spray may be supplied from the electromagnetic valve 31 to the twin-fluid nozzle 4 to prevent the liquid from dripping from the twin-fluid nozzle 4.

REFERENCE SIGNS LIST

1, 1*a*, 1*b*, 1*c* twin-fluid nozzle spray apparatus
2, 2*a*, 2*b* spray apparatus body

4 a twin-fluid nozzle
6 compressor
8 liquid tank
10~14 pipe
20 gas supply port
21 gas discharge port
22, 22*b* compressed-gas supply system
23 liquid supply port
24 liquid discharge port
25, 25*a* pressurized-liquid supply system
26 discharge port
27 control unit
28 CPU
29 memory
30 gas regulator
31 electromagnetic valve
32 pressure gauge
33 low-pressure regulator
34 electromagnetic valve
35 pressure gauge
36 positive displacement pump
37 liquid regulator
38 pressure gauge
39 electromagnetic valve
50 needle valve
51 electro-pneumatic regulator
52 water supply source
360 diaphragm pump
362 relief valve

The invention claimed is:

1. A twin-fluid nozzle spray apparatus, comprising:

a first gas regulator that outputs a compressed gas at a first gas pressure that is a predetermined gas pressure in a compressed-gas supply system;

a positive displacement pump that includes a diaphragm pump configured to output a pressurized liquid and a relief valve configured to feed the pressurized liquid back to a liquid supply side when a first liquid pressure of the pressurized liquid exceeds a predetermined liquid pressure in a pressurized-liquid supply system;

a liquid control valve configured to output the pressurized liquid output by the positive displacement pump while maintaining a second liquid pressure of the pressurized liquid at a discharge pressure;

a twin-fluid nozzle that mixes and sprays the compressed gas output by the first gas regulator and the pressurized liquid output by the liquid control valve;

a second gas regulator in parallel to the first gas regulator in the compressed-gas supply system and configured to output a compressed gas at a second gas pressure, lower than the predetermined gas pressure;

a pipe having elasticity through which the compressed gas or the pressurized liquid is supplied toward the twin-fluid nozzle; and a control circuit configured to perform time proportional control of a spray amount of the twin-fluid nozzle by switching between permitting and blocking supply of the pressurized liquid to the liquid control valve, and stop spray from the twin-fluid nozzle by blocking supply of the pressurized liquid and supply the compressed gas at the second gas pressure output by the second gas regulator to the twin-fluid nozzle.

2. The twin-fluid nozzle spray apparatus according to claim 1, wherein the twin-fluid nozzle mixes internally and sprays the compressed gas at the first gas pressure and the pressurized liquid while transmitting a pressure of the compressed gas output by the first gas regulator to the pressurized liquid output by the liquid control valve in a counter-flow direction to a liquid flow.

3. The twin-fluid nozzle spray apparatus according to claim 1, wherein the control circuit is configured to control a spray characteristic of the twin-fluid nozzle by controlling at least any of a pressure of the compressed gas output from the first gas regulator, a pressure of the pressurized liquid, and an opening degree of the liquid control valve.

4. The twin-fluid nozzle spray apparatus according to claim 1, further comprising:

a discharge valve that discharges the pressurized liquid output from the liquid control valve from the pressurized-liquid supply system using an atmospheric pressure from the twin-fluid nozzle or a pump head difference when spray from the twin-fluid nozzle is stopped.

5. The twin-fluid nozzle spray apparatus according to claim 1, wherein the liquid control valve is a liquid regulator.

6. The twin-fluid nozzle spray apparatus according to claim 1, wherein the liquid control valve is a needle valve.

7. A control method for a twin-fluid nozzle spray apparatus, comprising:

generating a compressed gas at a first gas pressure through a first flow path;

generating a compressed gas at a second gas pressure, lower than the first gas pressure, through a second flow path, parallel to the first flow path;

outputting one of the compressed gas at the first gas pressure and compressed gas at the second gas pressure to a twin-fluid nozzle;

outputting a pressurized liquid, and otherwise feeding a pressurized liquid back to a liquid supply side when a first liquid pressure exceeds a predetermined pressure in a pressurized-liquid supply system;

controlling a liquid control valve that receives the pressurized liquid output by the pressurized-liquid supply system to maintain a second liquid pressure of the pressurized liquid at a discharge pressure;

outputting the pressurized liquid at the discharge pressure to the twin-fluid nozzle;

performing time proportional control of a spray amount of the twin-fluid nozzle by switching between permitting and blocking supply of the pressurized liquid to the liquid control valve, and stopping spray from the twin-fluid nozzle by blocking supply of the pressurized liquid while suppling the compressed gas at the second gas pressure to the twin-fluid nozzle.

* * * * *